(12) United States Patent
Endo

(10) Patent No.: US 8,013,898 B2
(45) Date of Patent: *Sep. 6, 2011

(54) EXTERNAL STORAGE DEVICE FOR IMAGE PICKUP APPARATUS, CONTROL METHOD THEREFOR, IMAGE PICKUP APPARATUS AND CONTROL METHOD THEREFOR

(75) Inventor: Yoshiyuki Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,918

(22) Filed: Jan. 25, 2010

(65) Prior Publication Data

US 2010/0123798 A1 May 20, 2010

Related U.S. Application Data

(62) Division of application No. 11/167,432, filed on Jun. 28, 2005, now Pat. No. 7,675,557, which is a division of application No. 09/976,093, filed on Oct. 15, 2001, now Pat. No. 6,965,403.

(30) Foreign Application Priority Data

Oct. 16, 2000 (JP) ................................ 2000-314709
Oct. 15, 2001 (JP) ................................ 2001-316192

(51) Int. Cl.
*H04N 5/232* (2006.01)
(52) U.S. Cl. ............................... 348/211.1; 348/231.99
(58) Field of Classification Search ............. 348/333.11–333.12, 231.99–231.2
See application file for complete search history.

(56) References Cited

U.S. PATENT DOCUMENTS

| | | | |
|---|---|---|---|
| 5,806,005 A | 9/1998 | Hull et al. | 455/566 |
| 6,215,523 B1 | 4/2001 | Anderson | 348/333.05 |
| 6,364,697 B1 | 4/2002 | Tseng et al. | 439/533 |
| 6,429,896 B1 | 8/2002 | Aruga et al. | 348/231.99 |
| 6,445,460 B1 | 9/2002 | Pavley | 358/1.15 |
| 6,614,470 B1 | 9/2003 | Manowitz et al. | 348/211.14 |
| 6,701,058 B1 | 3/2004 | Tsubaki | 386/46 |
| 6,715,003 B1 | 3/2004 | Safai | 710/33 |
| 6,721,001 B1 | 4/2004 | Berstis | 348/231.3 |
| 6,868,451 B1 | 3/2005 | Peacock | 709/231 |
| 6,965,403 B2 | 11/2005 | Endo | 348/231.2 |
| 7,256,819 B1 | 8/2007 | Tanaka | 348/207.1 |
| 7,630,004 B2 * | 12/2009 | Watanabe et al. | 348/231.1 |
| 2001/0015760 A1 | 8/2001 | Fellegara et al. | 348/333.01 |
| 2003/0048365 A1 | 3/2003 | Saito et al. | 348/231.7 |

* cited by examiner

*Primary Examiner* — Tuan Ho
(74) *Attorney, Agent, or Firm* — Fitzpatrick, Cella, Harper & Scinto

(57) ABSTRACT

An external storage device is connected to an image pickup apparatus provided with a first image storage medium capable of storing plural taken images and image display means, and adapted for backup of image information stored in the first image storage medium. The device includes a second image storage medium, a connection detecting unit, a reception unit, a transfer means, a conversion unit, and a second transfer unit. The transfer unit writes predetermined taken image information read from the first image storage medium into the second image storage medium and erases the predetermined taken image information from the first image storage medium according to a detection output of the connection detecting unit and an output of the reception unit. The conversion unit converts the predetermined taken image information into an image matching a display ability of the image display means. The second transfer unit writes the converted image information in the first image storage medium.

13 Claims, 11 Drawing Sheets

EXTERNAL STORAGE DEVICE FOR IMAGE PICKUP APPARATUS, CONTROL METHOD THEREFOR, IMAGE PICKUP APPARATUS AND CONTROL METHOD THEREFOR

This application is a division of U.S. patent application Ser. No. 11/167,432, filed on Jun. 28, 2005, now pending, which is a divisional of application Ser. No. 09/976,093, filed Oct. 15, 2001, now U.S. Pat. No. 6,965,403 issued on Nov. 15, 2005.

BACKGROUND OF THE INVENTION

1. Field of the Invention

The present invention relates to an external storage device for an image pickup apparatus for backup storage of an image taken by the image pickup apparatus, and also to a control method therefor, an image pickup apparatus and an image management method.

2. Related Background Art

FIG. 18 is a schematic block diagram showing the configuration of a conventional digital camera, wherein a camera module 210 is composed of an image pickup lens 212, an image pickup element 214 of CCD type, an image pickup element control circuit 216 and an image processing circuit 218. When an image pickup operation mode is selected after the power supply is turned on, a CPU 220 initializes the camera module 210 and renders it operable, and also activates a display system composed of an LCD display device 222, a display drive circuit 224, an LCD control circuit 226 and a VRAM (video memory) 228. The LCD display device 222 functions as an electronic view finder and has a display ability of 640×480 pixels.

The image pickup element 214 converts an optical image, formed by the image pickup lens 212, into an electrical signal. The image pickup element control circuit 216 executes noise elimination and gain adjustment on the image signal outputted from the image pickup element 212 and converts the signal into a 10-bit digital signal for supply to the image processing circuit 218. The image processing circuit 218 applies processes such as white balancing, exposure adjustment, correction for flash exposure etc. to the image data from the image pickup element control circuit 216 and converts the image data into the YCbCr format (Y: luminance signal, Cb, Cr: color difference signals). In case the image pickup element 214 has about two million pixels, the image processing circuit 218 can process the image data of about 1600×1200 pixels, but processes the image data normally in a size of 320×240 pixels and 640×480 pixels at largest in the stage of displaying in the view finder.

The CPU 220 supplies the YCbCr image data from the image processing circuit 218 to the LCD control circuit 226 by DMA (direct memory access) method in a display size of 320×240 pixels. The LCD control circuit 226 once stores the YCbCr image data from the CPU 220 into the VRAM 228 after conversion into the RGB format, and then reads the image data from the VRAM 228 for supply to the display control circuit 224, which drives the LCD display device 222 according to the RGB data from the LCD control circuit 226. In this state, a monitor image (object image) of 320×240 pixels is displayed in an arbitrary portion in the image area of 640×480 pixels of the LCD display device 222.

By executing the process from the readout of the image pickup element 212 to the display on the LCD display device 222 in continuous manner with a cycle time of 1/30 seconds, an object image corresponding to the optical image entering the image pickup element 212 is constantly displayed on the image area of the LCD display device 222.

In case of taking an image, the user switches the apparatus to an image pickup mode. When a shutter switch 230 is depressed, the CPU 220 locks the set values of the white balancing, exposure adjustment, correction for flash photographing, etc., in the image processing circuit 218, and terminates the function of the LCD control circuit 226, the display drive circuit 224, and the LCD display device 222, in order to alleviate the load on the CPU 220.

In a view finder process, there is processed only a part of the image data of the image pickup element 212 in order to increase the processing speed, but the entire image data of 1600×1200 pixels are processed in the image pickup mode. More specifically, the image processing circuit 218 applies the aforementioned process to the image data of all the pixels of the image pickup element 214, and the CPU 220 writes the YCbCr image data from the image processing circuit 218 into an image development area 232a of a RAM 232. The CPU 220 also compresses the image data in the image development area 232a by a method based on the JPEG standard, and writes the compressed data in a folder prepared in advance in a flash memory 234 with a file name consisting of numerical data such as an arbitrary number of date data. Such folder is given a folder name based on a DCF (Design rule for Camera File system) standard of the digital still camera. The taken images are written in succession into such folder. In case of image taking by mounting the same memory card in a camera of another type, there is automatically prepared another file into which the taken image are stored.

The operation program and fixed data for the CPU 220 are stored in a ROM 236. There are also provided a chargeable battery 238 constituting a power source, and a DC/DC converter 240 for converting the output voltage of the battery 238 for supply to the CPU 220 and other circuit blocks. The CPU 220 is connected to a USB connector 244 through a USB module 242.

In the following there will be explained a reproduction mode for reproducing and displaying the taken image. When the image reproduction mode is selected by an unrepresented operation mode designation switch, the CPU 220 activates the LCD display device 222 thereby putting it in a standby state. The CPU 220 displays the folders, belonging to the apparatus and contained in the flash memory 234, in the image area of the LCD display device 222, and causes the operator to select one of the folders. When an image file to be displayed is designated after the folder selection, the CPU 220 reads and expands the designated file from the memory 234 and applies the YCrCb image data to the LCD control circuit 226. The LCD control circuit 226 once stores the YCrCb image data from the CPU 220 into the VRAM 228 after conversion into the RGB format, and then reads the image data from the VRAM 228 for supply to the display control circuit 224, which drives the LCD display device 222 according to the RGB data from the LCD control circuit 226. In this state, a reproduced image is displayed in the entire image area of 640 x 480 pixels of the LCD display device 222.

In case the image folder is not designated after the folder selection, the CPU 220 reads the image files of a designated number from the oldest date of image pickup, expands such image files and supplies the LCD control circuit 226 with the YCrCb image skipped to a smaller thumbnail size of 80×60 pixels. The LCD control circuit 226 converts the YCbCr image data of the plural images from the CPU 220 in succession into the RGB format, writes them into the VRAM 228 for simultaneous display, and then reads the image data of the plural thumbnail images from the VRAM 228 for supply to the display drive circuit 224 for the display in the wire image area. The display drive circuit 224 drives the LCD display device 222 according to the RGB data from the LCD control circuit 226, whereby plural thumbnail images are simultaneously displayed on the image area of 640×480 pixels of the LCD display device 222.

The CPU 220 also supplies the LCD control circuit 226 with image data including, for example, a warning about remaining battery capacity and various control messages, and the LCD control circuit 226 converts such image data into the RGB format and stores them in an address of the VRAM 228 corresponding to a display position, whereby the warning for the remaining battery capacity, etc., is displayed in a predetermined position in the image area of the LCD display device 222.

The CPU 220 can transfer the data, stored in the flash memory 234, to a device connected to the USB connector 244, such as a computer. For example a USB cable is connected to the USB connector 244, then a PC connection mode is set by the unrepresented operation mode designating switch and the other end of the USB cable is connected to the USB connector of the computer. Upon connection of the USB cable, the computer automatically identifies the device connected through the USB cable and activates a data fetching software. When the operator selects, with a mouse, one of the functions displayed on the display of the computer, the computer issues a command to the CPU 220 through the USB connector 244 and the USB module 242, and, based on such command, the CPU 220 reads the designated data from the flash memory 234 and transfers them to the computer.

The conventional digital camera utilizes, as the memory means for the taken images, not only the flash memory incorporated in the main body but also a detachable CF card utilizing a flash memory or a hard disk. The memory capacity of such external memory medium is more or less limited though it is recently increasing, it is necessary to transfer the stored data to another information memory device thereby securing the empty area. However, it is cumbersome to connect and activate the computer merely for the data backup, since the computer generally requires a long time for activation.

Even in case of backup of the taken image data in the computer, the data transferred to the computer are merely a copy of the image data. In case of reproducing the taken image again in the digital camera, there is required an operation of returning the taken image data (for example data of 1600×1200 pixels (about 700 kB)) from the computer to the flash memory 234, or an operation of reducing the data of 1600×1200 pixels to data of 640×480 pixels (about 35 kB) by an image conversion tool in the computer prior to transfer to the digital camera. The former operation reduces the empty area of the flash memory 234, while the latter operation involves a cumbersome operation.

There is recently proposed a receiving member (called a cradle) having functions not only of charging the rechargeable battery 238, but also of transferring the data stored in the flash memory 234 to the computer in response to the placement of the main body of the camera in a predetermined position or the start of charging of the rechargeable battery 238. However such receiving member is merely a charging device unless the computer is activated, and does not dispense with the procedure of activating the computer.

SUMMARY OF THE INVENTION

An object of the present invention is to resolve all the aforementioned drawbacks or at least one thereof.

Another object of the present invention is to provide an external storage device for an image pickup apparatus, capable of resolving the aforementioned drawbacks.

The above-mentioned objects can be attained, according to the present invention, that is, the present invention is directed to an external storage device which is connected to an image pickup apparatus provided with a first image storage medium capable of storing plural taken images and image display means and adapted for backup of image information stored in the first image storage medium, the device comprising:

a second image storage medium capable of storing plural image information;

a connection detecting unit for detecting the connection with the image pickup apparatus;

a reception unit for accepting a backup instruction for the taken image by a user; and transfer means for writing predetermined taken image information read from the first image storage medium into the second image storage medium and erasing the predetermined taken image information from the first image storage medium according to a detection output of the connection detecting unit and an output of the reception unit.

Still another object of the present invention is to enable confirmation of the data transferred to an external storage device, later in the image pickup apparatus.

Still another object of the present invention is not to excessively use the memory of the image pickup apparatus, even in case of confirming the data transferred to the external storage device, later in the image pickup apparatus.

The above-mentioned objects can be attained, according to the present invention, in addition to the aforementioned configuration, that is, the present invention is directed to an external storage device further comprising:

a conversion unit for converting the predetermined taken image information, written into the second image storage medium, into an image matching a display ability of the image display means; and a second transfer unit for writing image information converted by the conversion unit in the first image storage medium.

Still another object of the present invention is to enable operation on the image file stored in the external storage device while maintaining the configuration thereof as simple as possible.

The above-mentioned object can be attained, according to the present invention, in addition to the aforementioned configurations, in a configuration in which the image pickup apparatus has means for operating the file in the second image storage medium and the external storage device executes operation on the image file recorded in the second storage medium according to the aforementioned operation on the file.

Still other objects of the present invention, and the features thereof, will become fully apparent from the following description of the embodiments, to be taken in conjuction with the accompanying drawings.

DETAILED DESCRIPTION OF THE PREFERRED EMBODIMENTS

Now the present invention will be clarified in detail by preferred embodiments thereof, with reference to the accompanying drawings.

Figure 1:
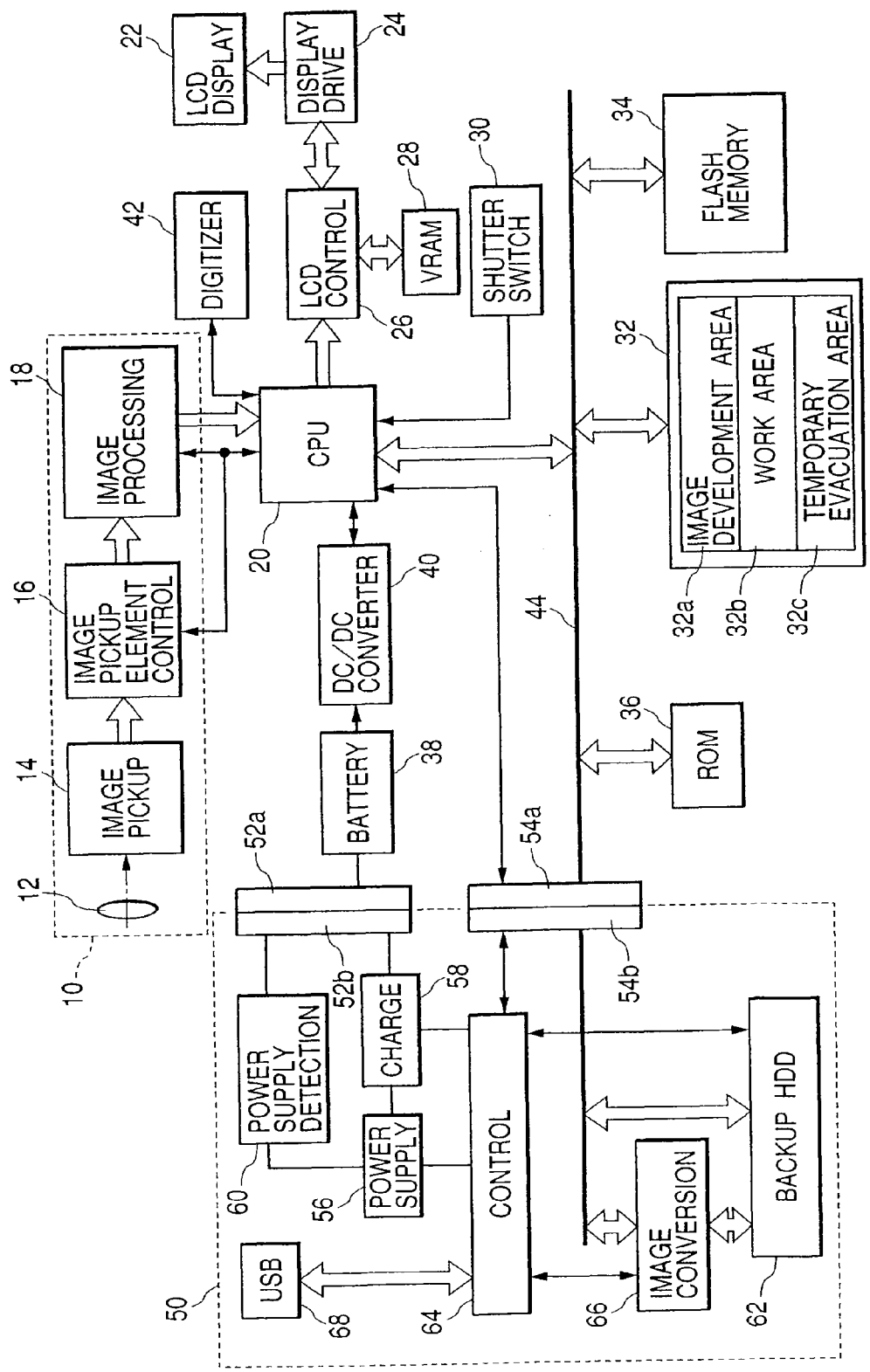
FIG. 1 is a schematic block diagram showing the configuration of a first embodiment of the present invention.

FIG. 1 is a schematic block diagram showing the configuration of an embodiment of the present invention, wherein a camera module 10 is composed of an image pickup lens 12, a CCD image pickup element 14, an image pickup element control circuit 16 and an image processing circuit 18. The image pickup element 14 converts an optical image, formed by the image pickup lens 12, into an electrical signal. The image pickup element control circuit 16 is provided with a timing generation circuit for supplying the image pickup element 14 with a transfer clock signal and a shutter signal, a CDS/AGC circuit for applying noise elimination and gain adjustment on the image signal from the image pickup element 14 and an A/D converter for converting the analog output of the CDS/AGC circuit into a 10-bit digital signal. The image pickup element control circuit 16 constantly outputs the image data of 30 frames per second. The image processing circuit 18 applies image processings such as white balancing and exposure adjustment to the image data from the image pickup element control circuit 16 and converts the image data into the YCbCr format for output.

There are also provided a CPU 20 for controlling the entire apparatus and executing an image compression/expansion process based for example on the JPEG standard, an LCD display device 22 serving as an electronic view finder, a display drive circuit 24 for driving the LCD display device 22, an LCD control circuit 26 for controlling the display drive circuit 24 thereby causing the LCD display device 22 to display the image stored in a VRAM 28, and a shutter switch 30. The LCD display device 222 functions as an electronic view finder and has a display ability of 640×480 pixels.

There are also provided a RAM 32 including an image development area 32a, a work area 32b and a temporary evacuation area (or stack area) 32c, a flash memory 34 for storing taken image data, a ROM 36 for storing a control program for the CPU 20 and initial set information for folders, a rechargeable battery 38 constituting a power source, a DC/DC converter 40 for converting the output voltage of the rechargeable battery 28 into voltages required for the CPU 20 and other components, and a digitizer 42 functioning as character input means and a pointing device.

A system bus 44, connecting the CPU 20, the RAM 32, the flash memory 34 and the ROM 36, is composed of an address line, a data line and a control line.

A cradle 50, having a function of charging the rechargeable battery 38 and a backup function for the data stored in the flash memory 34, is provided with a power supply connector 52b which is connected to a power supply connector 52a connected to the rechargeable battery 38 in the main body of the camera and a data connector 54b which is connected to the system bus 44 in the main body of the camera. There are also provided a power supply circuit 56 for supplying various parts of the cradle 50 with electric power, a charging circuit 58 for charging the rechargeable battery 38 with the output of the power supply circuit 56, a power supply detection circuit 60 for detecting whether the power supply connectors 52a, 52b are connected by the voltage at the power supply connector 52b, thereby activating the power supply circuit 56, a hard disk device (HDD) 62 for image data backup, a control circuit 64 for controlling data writing into and data readout from the HDD 62 according to a control signal from the CPU 20, an image conversion circuit 66 for converting the image size and the number of gradation levels, and a USB connector 68. By connecting a computer to the USB connector 68, the memory content of the HDD 62 can be referred to from such computer.

In the following there will be explained the function of the present embodiment. The CPU 20 controls the operations based on the control programs in the ROM 36. Such control programs include those for a process of DMA transfer of the taken image data, outputted from the image processing circuit 18, to the RAM 32, a process of DMA transfer of the data from the RAM 32 to the LCD control circuit 26, a process of executing JPEG compression of the image data and storing the image data in a predetermined file format in the flash memory 34, and a process of instructing an image pickup operation based on the actuation of the shutter switch 30 and converting an input from the digitizer 42 into coordinate data with character recognition if necessary. There are also included programs for the following controls, such as transfer of the image data.

The image development area 32a of the RAM 32 temporarily stores the taken image data (YCbCr) from the image processing circuit 18. The RAM 32 is also used as a temporary buffer for temporarily storing the JPEG compressed image data read from the flash memory 34 and as an image exclusive work area for image compression and development.

When the flash memory 34 is mounted and connected to the system bus 44, the CPU 20 prepares, in the memory 34, a DCF corresponding folder structure for storing the taken image. When the operator depresses the shutter switch 30, the CPU 20 executes JPEG compression of the taken image data from the image processing circuit 18, then adds additional data in a predetermined format to the compressed taken image data and stores the data as a JPEG file in the folder identified by the date and time of image pickup. The folder is prepared anew for a different date and time of image pickup.

When the reproduction mode is selected after the image pickup, the CPU 20 prepares thumbnail images from the image file in each folder in the flash memory 34 and simultaneously displays such thumbnail images. In such thumbnail images, the operator selects an image to be displayed over the entire image area by touching the digitizer 42 with a pen. Based on the coordinate information from the digitizer 42, the CPU 20 identifies the selected image and reads the data of the selected image from the flash memory 34. The CPU 20 develops the read data with JPEG expansion in the image development area 32a, then executes skipping to 640×480 pixels and transfer to the LCD control circuit 26 for display on the image area of the LCD display device 22.

It is also possible to display the content of all the files in the flash memory on the monitor image of the computer, by detaching the flash memory 34 from the main body of the camera and connecting it to the computer through a known card reader.

The LCD control circuit 26 converts the YCrCb image data (the taken image data from the image processing circuit 18 or the JPEG expanded image data read from the flash memory 34) from the CPU 20 into the RGB format and writes such image data into the VRAM 28 in the form of an image to be displayed, and then reads such RGB data for supply to the display drive circuit 24, which drives the LCD display apparatus 22 according to the RGB image data from the LCD control circuit 26. The LCD display device 30 is composed of a TFT liquid crystal display panel of about VGA size (640× 480 pixels).

The shutter switch 30 is to instruct the start of the image pickup operation and can assume a half depressed state and a fully depressed state, as already known i for still cameras. The CPU 20 reads image pickup conditions from a folder designated prior to the image pickup operation, and sets the control parameters. such as the shutter speed and the diaphragm stop value, close to such image pickup conditions. The CPU 20 locks the control parameters, such as the shutter speed and the diaphragm stop value, when the shutter switch 30 is half depressed, and, when it is fully depressed, executes development of the taken image data from the image processing circuit 18 in the image development area 32a of the RAM 32 with JPEG compression, and stores the image data with a predetermined file name in the designated folder of the flash memory 34.

When the main body of the camera is placed on the cradle 50, the power supply connectors 52a, 52b are mutually connected and the data connectors 54a, 54b are also mutually connected. The power supply detection circuit 60 detects the connection of the power supply connectors 52a, 52b by the voltage thereof and sends a signal, indicating the connection state, to the power supply circuit 56. In response, the power supply circuit 56 sends the electric power to the cradle 50 and also sends the electric power to the charging circuit 58 thereby initiating the charging of the rechargeable battery 38. The charging circuit 58 monitors the charging voltage of the rechargeable battery 38 and terminates the charging operation when a specified voltage is reached.

Figure 2:
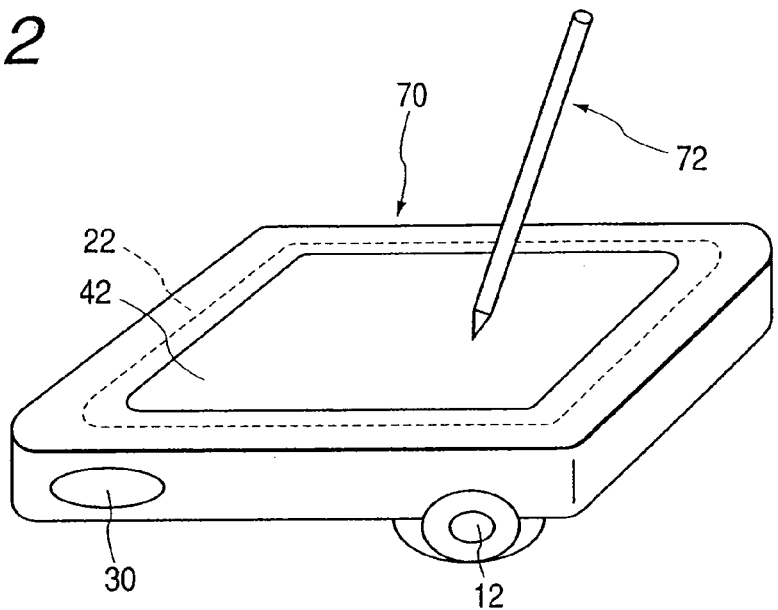
FIG. 2 is a perspective view of the main body of the camera of the first embodiment.
Figure 3:
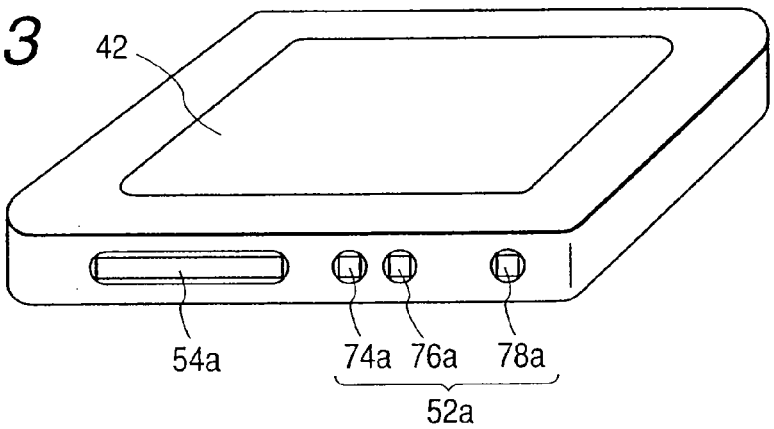
FIG. 3 is a perspective view of the main body of the camera of the first embodiment, seen from another direction.

FIG. 2 is a perspective view of the main body of the camera seen from front while FIG. 3 is a perspective view of the main body of the camera seen from rear, showing an external casing 70 and a pen 72 to be used for character input and position designation on the digitizer 42. The power supply connector 52a is provided with terminals 74a, 76a, 78a. The terminal 74a is used for detecting the connection of the cradle, while the terminal 76a is used for charging, and the terminal 78a is an on/off control terminal for supplying, from the main body of the camera, a trigger signal for activating the power supply circuit 56 of the cradle 50 when the main body of the camera is set on the cradle 50.

Figure 4:
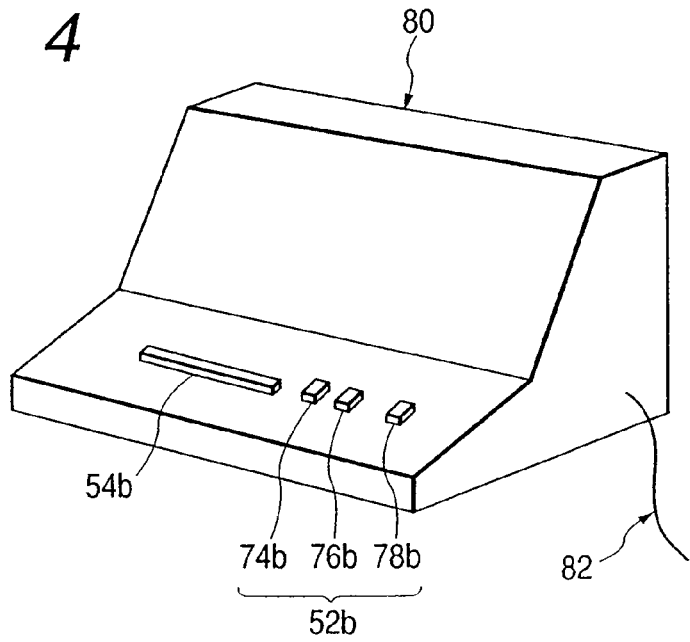
FIG. 4 is an external view of a cradle 50.

FIG. 4 is a schematic perspective view of the cradle 50, showing a main body 80 of the cradle. The power supply connector 52b is provided with three terminals 74b, 76b, 78b, respectively opposed and connectable to the terminals 74a, 76a, 78a of the power supply connector 52a.

Figure 5:
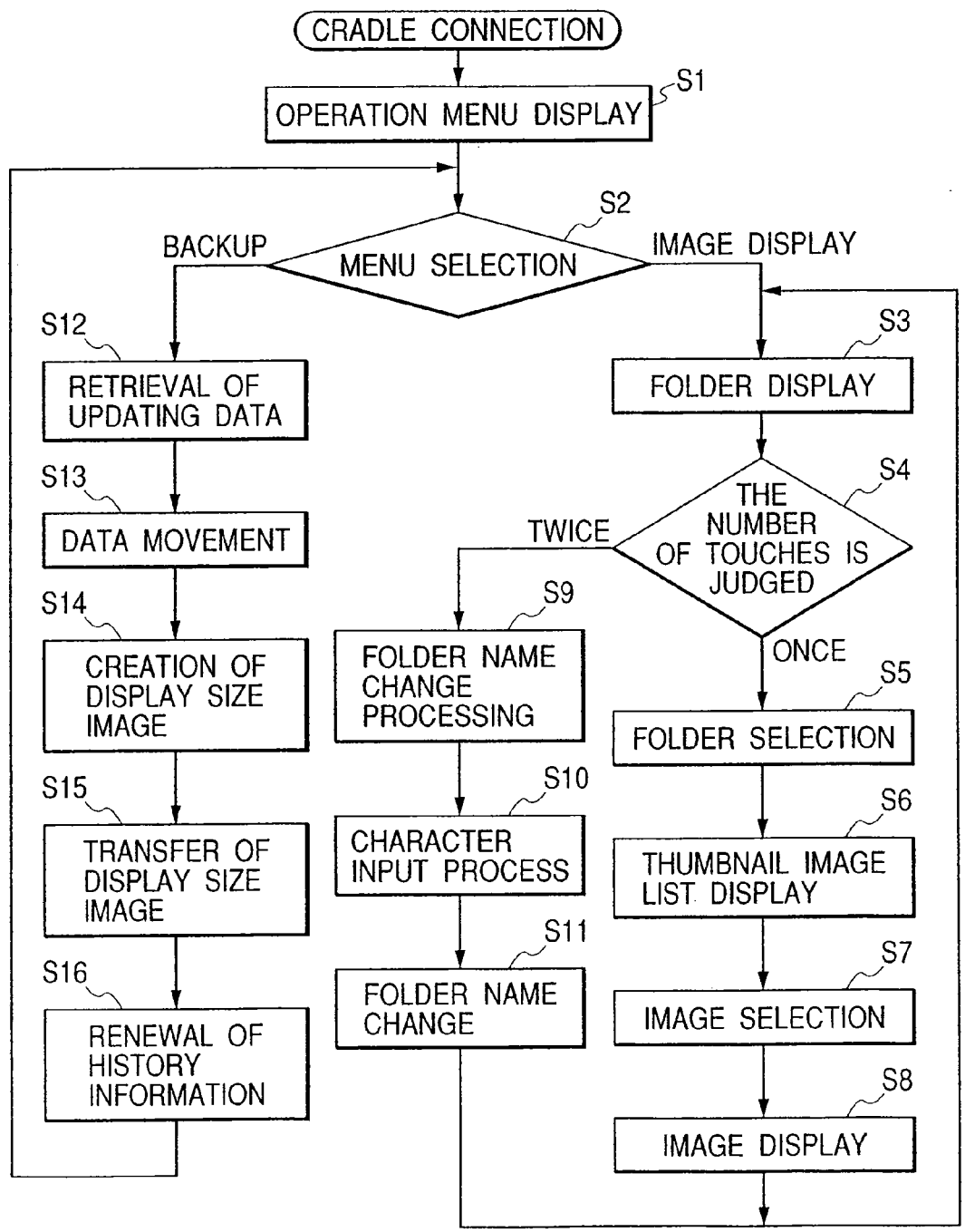
FIG. 5 is a flow chart showing operations of the cradle.
Figure 6:
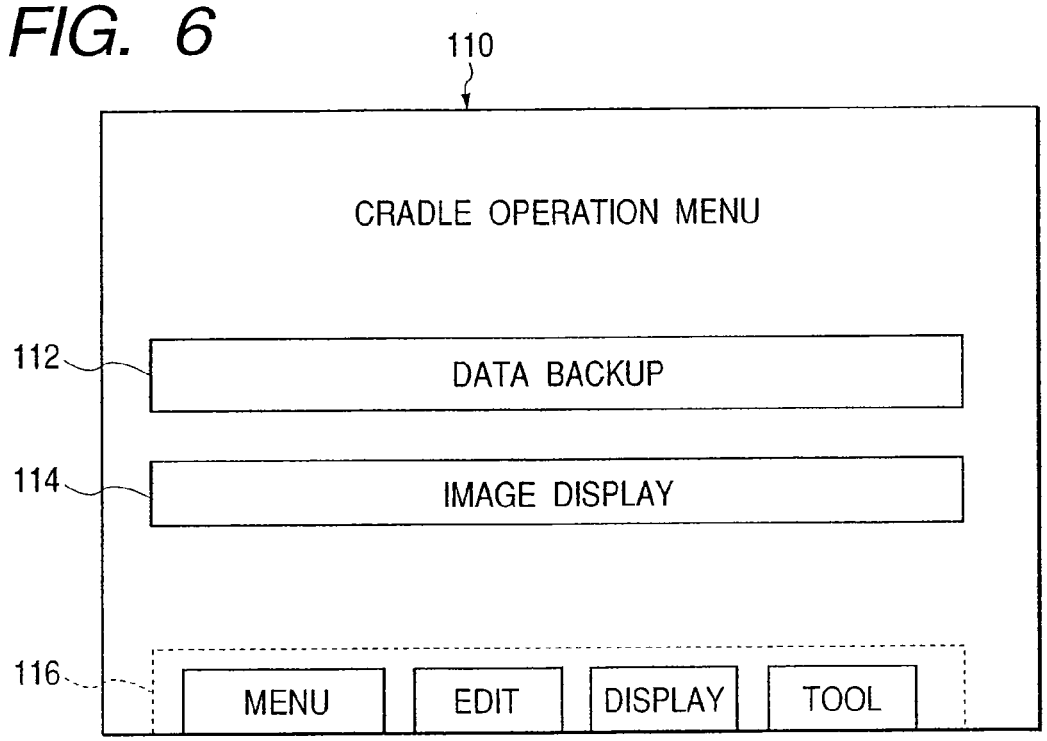
FIG. 6 is a view showing a first example of display in the cradle operation.

FIG. 5 is a flow chart showing the operation of data storage, folder change and image display in the cradle 50, and FIGS. 6 to 13 show examples of display in various process steps.

When the operator sets the main body of the camera on the cradle 50 after turning on the power supply of the camera, a signal is supplied to the on/off control connector 78b of the cradle 50 whereby the power supply therein is automatically turned on. On the image area of the LCD display device 22, there is displayed a cradle operation menu image 110 shown in FIG. 6 (S1). On the cradle operation menu image 110, there can be selected a "data backup" menu 112 or an "image display" menu 114. In the lower part of the image there are displayed operation commands 116 for menu, editing, display and tool. These operation commands 116 are displayed in any mode, except in case of the image display on the entire image area.

When the operator touches a desired item with the pen 72, the digitizer 42 transmits the coordinate data of the operated position to the CPU 20, which in response identifies the selected menu (S2). According to thus identified menu, the CPU 20 reads a program from the ROM 36 and executes a corresponding process. Regardless of the state of the image display, by touching the "menu" item in the operation commands 116, there is displayed the cradle operation menu 110, and touching "editing", the display is switched to a folder structure display image 120 shown in FIG. 7. The items "display" and "tool" in the operation commands 116 change the functions thereof according to the status of image display.

Figure 7:
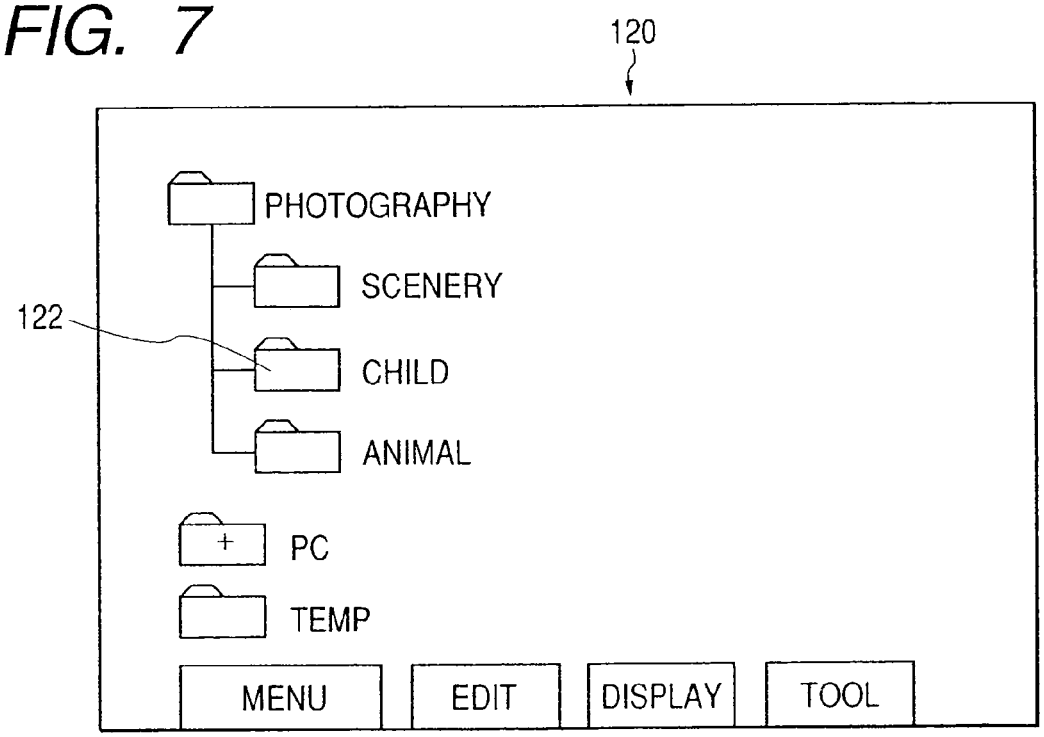
FIG. 7 is a view showing a second example of display in the cradle operation.
Figure 8:
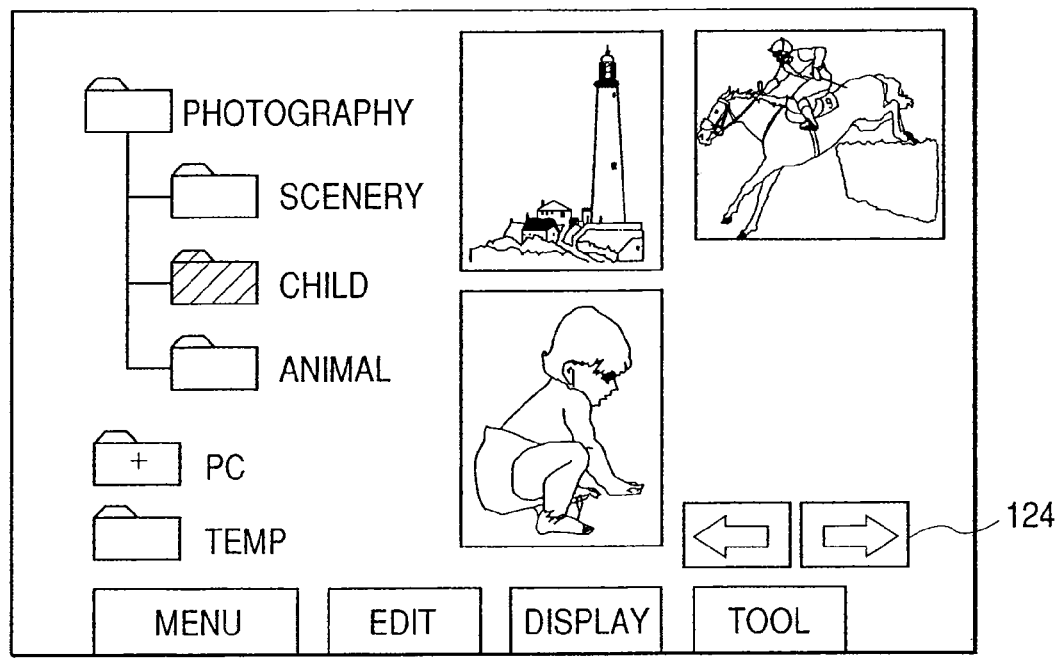
FIG. 8 is a view showing a third example of display in the cradle operation.
Figure 9:
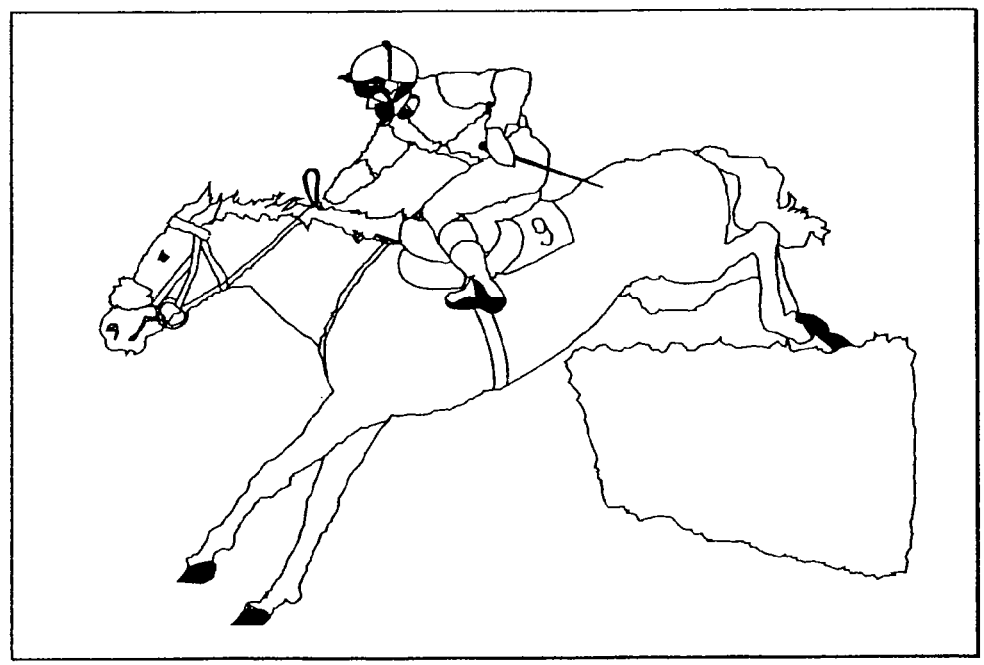
FIG. 9 is a view showing a fourth example of display in the cradle operation.

In case the operator touches the "image display" menu 114, the LCD display device 22 displays, as shown in FIG. 7, the folder structure prepared in the backup HDD 62 of the cradle 50 (S3). When the operator executes a single touch on an arbitrary folder 122 within the displayed folders with the pen 72 (S4), the touched folder mark is reversal displayed (S5), and the reduction images (thumbnail images) of the images stored in such folder are simultaneously displayed as shown in FIG. 8 (S6). By selecting one of such images (for example by touching with the pen 72), the touched image is displayed in a large size as shown in FIG. 9 (S8). When the thumbnail images are displayed, there is simultaneously displayed lateral movement keys 124 for changing the displayed thumbnail images, as shown in FIG. 8. By touching such lateral movement keys 124 with the pen 72, the displayed thumbnail images can be changed within the same folder.

The CPU 20 discriminates single touch or double touches according to the coordinate information from the digitizer 42 and the time interval of transmission of such information.

Figure 10:
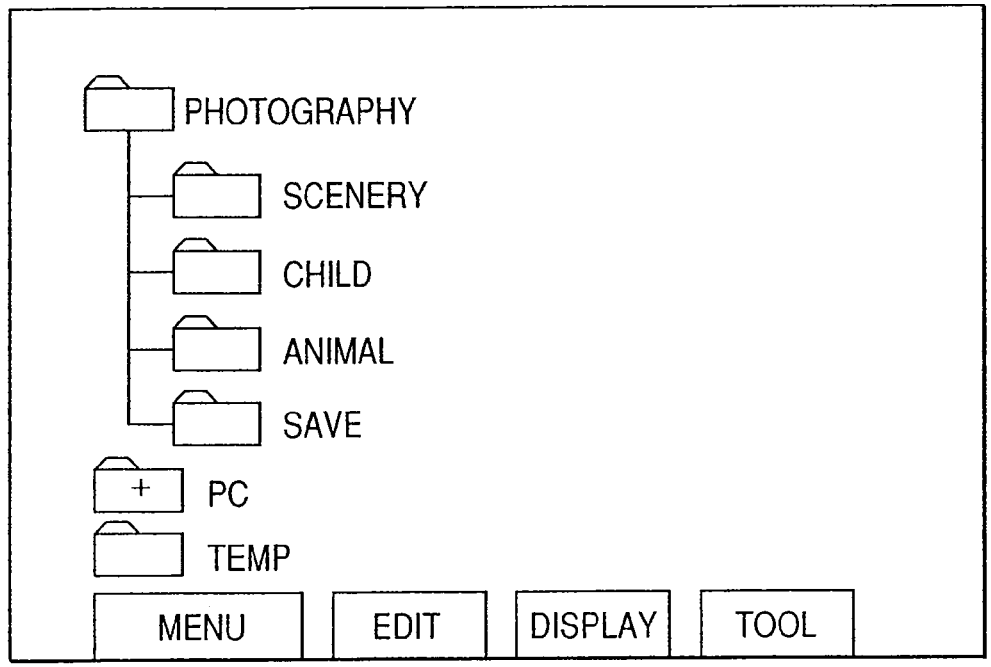
FIG. 10 is a view showing a fifth example of display in the cradle operation.
Figure 11:
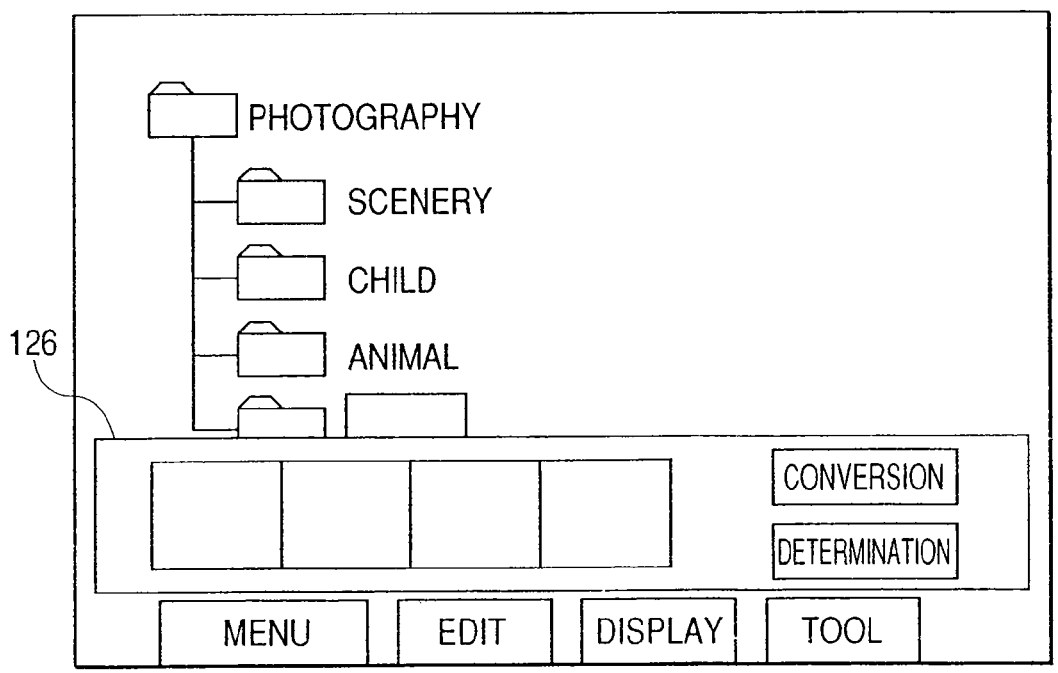
FIG. 11 is a view showing a sixth example of display in the cradle operation.
Figure 12:
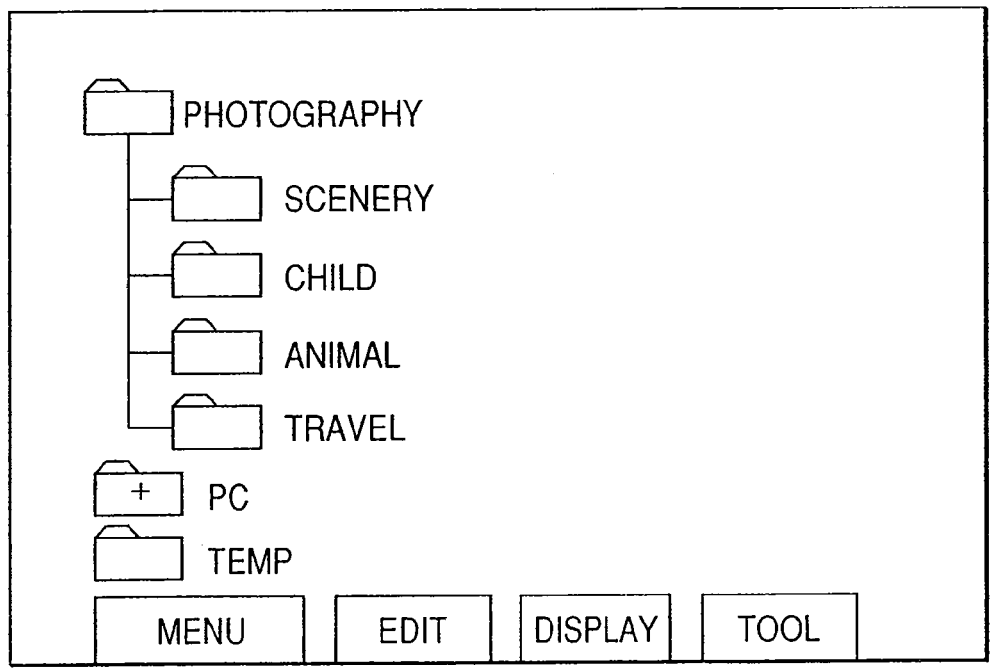
FIG. 12 is a view showing a seventh example of display in the cradle operation.

When a desired folder is double touched by the pen 72 (S4), there is activated a folder name changing process (S9). Let us consider an example of selecting a "save" folder by double touches in a state of displaying the folder structure as shown in FIG. 10. The name of the selected folder becomes blank as shown in FIG. 11 and a character input window 126 is displayed at the same time. The operator can enter an arbitrary folder name with the pen (S10), and the CPU 20 recognizes the trace written in the character input window 126 by a character recognition process and registers it as a new folder name, thereby renewing the display (S11). FIG. 12 shows the display of the folder structure after the file name is changed to "Travel".

Figure 13:
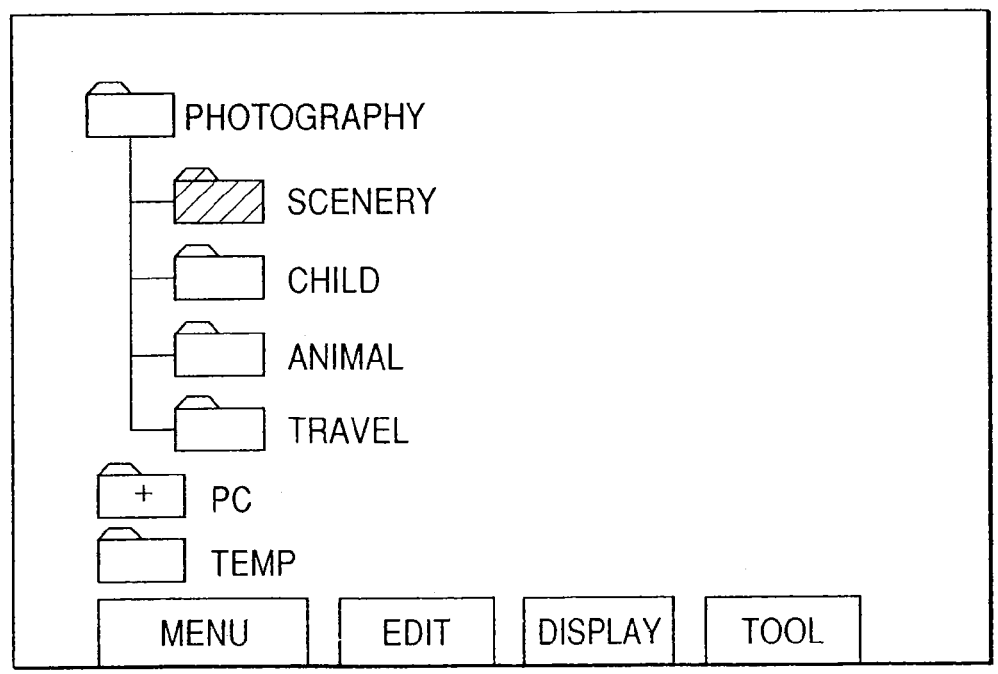
FIG. 13 is a view showing an eighth example of display in the cradle operation.

In the following there will be explained a movement of the image, stored in the backup HDD 62, between the folders. In the thumbnail image display shown in FIG. 8, the operator presses the pen 72 to a thumbnail image to be moved, then moves the pen to another folder mark while maintaining the pressed state and lifts the pen 72 from the digitizer 42. The CPU 20 identifies the thus-selected and moved thumbnail image, then changes the folder information of the corresponding image file in the backup HDD 62 to a folder of destination and reversal displays such folder of destination as shown in FIG. 13. In this manner the desired image can be moved to another folder by a simple operation. Such file moving operation under the GUI (graphical user interface) is already known in the field of computer and other information processing apparatus.

In the following there will be explained a data backup operation of the cradle 50. When the operator displays the cradle operation menu image (FIG. 6) and selects the "data backup" menu 112 with the pen 72 (S2), the CPU 20 prepares a folder in the backup HDD 62 of the cradle 50, searches a newly taken image (S 12) within the image data in the flash memory 34 (S12), and moves (backup) the image data to such new folder (S 13). Having received the image data, the cradle 50 skips the image data to a size matching the display dot number of the LCD display device 22 by the image changing circuit 66, and converts the gradation levels according to the number of gradation levels of the LCD display device 22, thereby reducing the data amount of the image (S14). Thus, while the image data, taken with the image pickup element of two million pixels, have a data amount of about 700 kB after JPEG compression, the image data matching the VGA display size of 640×480 pixels have a data amount reduced to about 1/20 or 35 kB. The image data can be further reduced also by decreasing the number of gradation levels. After such conversion, the converted image data are copied in the flash memory 34 (S15), and history information is added to the image data backed up in the backup HDD 62 (S16).

The folder automatically prepared by such backup process may be subjected to the process of folder name change or image movement explained in the foregoing, in case it is desired to change the folder name or the storage location.

Figure 14:
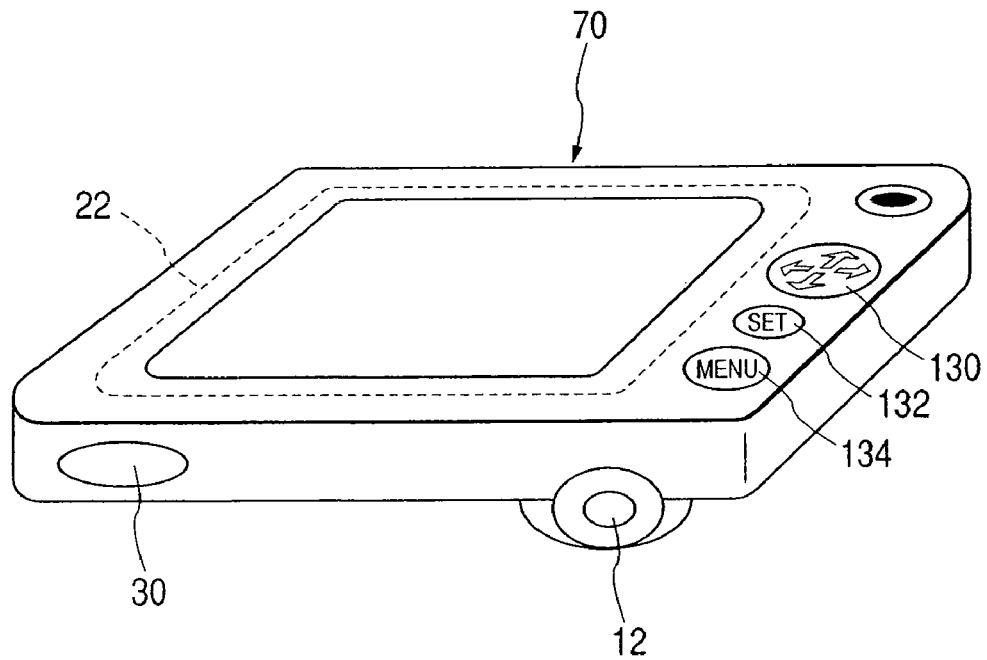
FIG. 14 is a perspective view of the main body of a camera of a second embodiment.

Instead of input using the pen 72 and the digitizer 42, there may naturally be employed a pointing device of a similar function. FIG. 14 is a perspective view of an embodiment provided with a cursor moving key, while FIG. 15 is a perspective seen from another direction, and FIG. 16 is a schematic block diagram showing the configuration, wherein components same as those in the embodiment shown in FIG. 1 are represented by like numbers.

Figure 15:
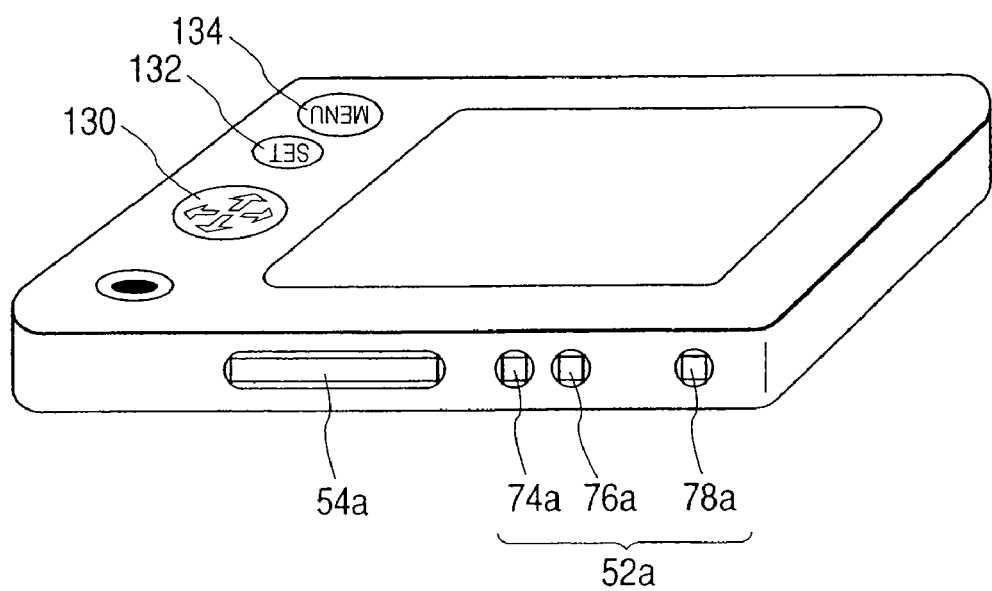
FIG. 15 is a perspective view of the main body of the camera of the second embodiment, seen from another direction.
Figure 16:
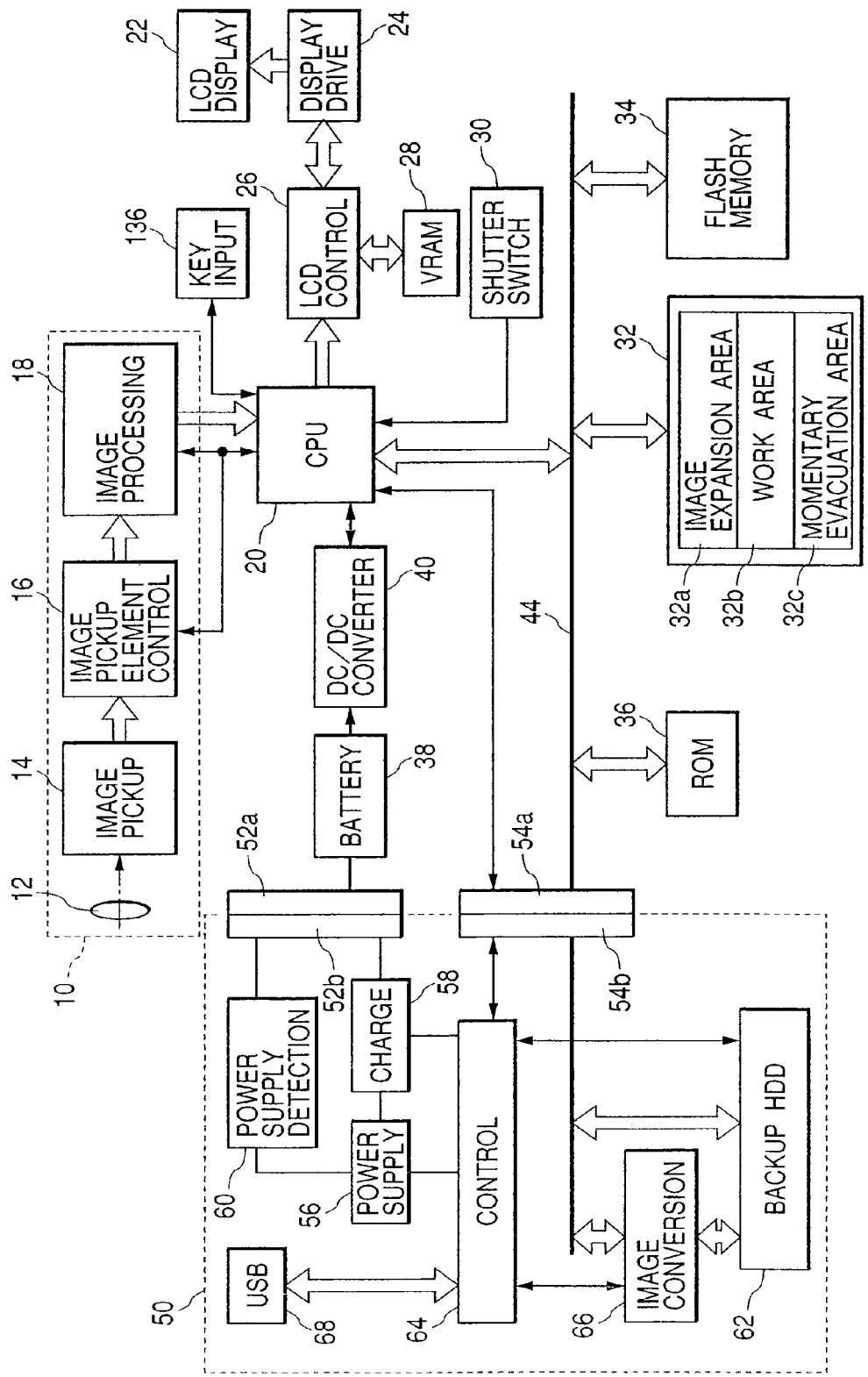
FIG. 16 is a schematic block diagram showing the configuration of the second embodiment.

Referring to FIGS. 14 and 15, there are shown a cursor key switch for designating the cursor movement, a set switch 132 for instructing determination in the mode setting, image selection, etc., and a mode switch 134 for calling functions such as editing and tool. The key switches 130, 132, 134 can be used to realize an operation environment same as that realized with the pen 72 and the digitizer 42. In FIG. 7, there is shown a key input device 136 for controlling the cursor key switch 130, the set switch 132 and the mode switch 134.

There may be transferred, to the image pickup apparatus, not only the reduction image of the image stored in the cradle but also the directory structure in the backup HDD 62.

In such case, there can be enabled the operation on the file or folder even in the absence of the connection with the cradle. In case of a change in the file name, folder name or directory structure, the history information on such change is stored, for example, in the memory 34 of the image pickup apparatus.

Then, when the connection is made again with the cradle, such change history information may be referred to match the directory structure and the file name between the image pickup apparatus and the cradle.

In this manner, there can be enabled the operation on the files and the matching between the image pickup apparatus and the cradle constituting the external memory device, even in the non-connected state.

In the above-described embodiment, the connectors 52*a*, 52*b*, 54*a*, 54*b* are employed for connecting the main body of the camera and the cradle 50, but wireless connection may be employed simply for signal connection, namely if the charging function is not required. Various wireless communication systems such as IrDA (trade name) or Bluetooth (trade name) are currently becoming popular, and such systems may be employed to provide an advantage of executing operations from a remote location.

In such case, the file operation on the main body of the camera can be reflected on the cradle on real-time basis within a distance allowing communication. In such case, it is not necessary to store the change history information mentioned above.

In case the communication is not possible, for example, because of an excessively large distance, the above-mentioned change history information may be utilized to achieve matching of the information when communication becomes possible.

Figure 17:
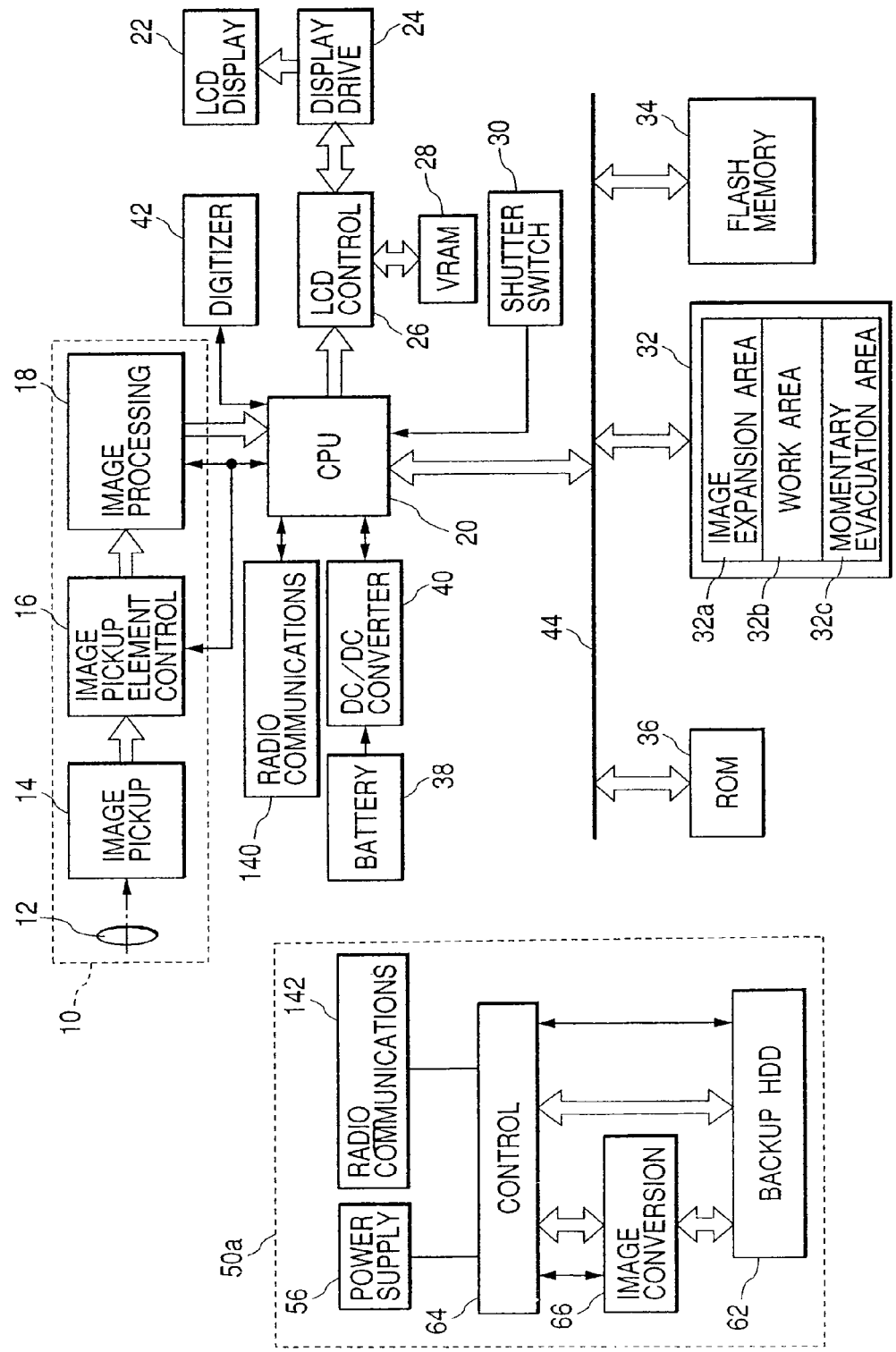
FIG. 17 is a schematic block diagram showing the configuration of a third embodiment.
Figure 18:
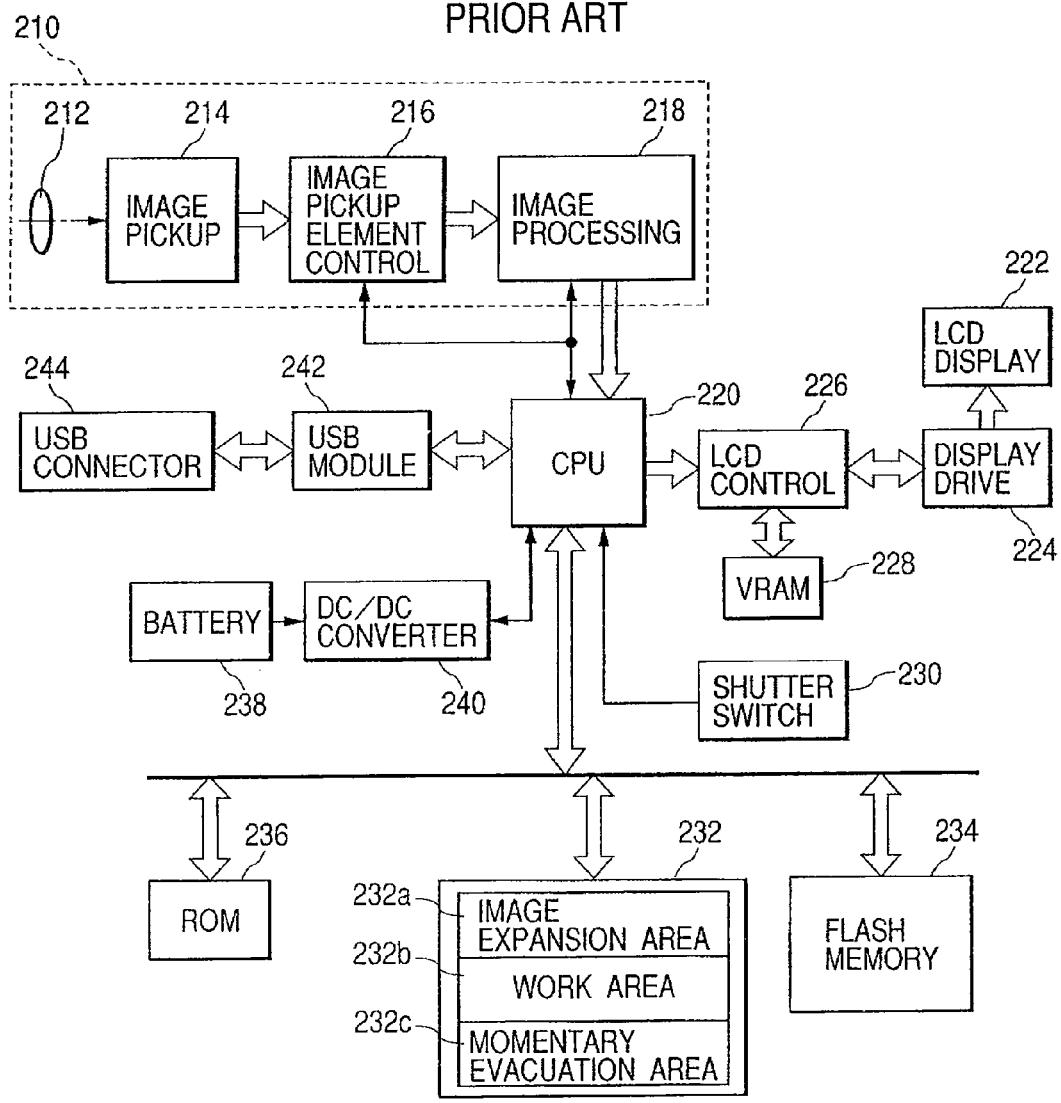
FIG. 18 is a schematic block diagram showing a conventional configuration.

FIG. 17 is a schematic block diagram showing the configuration of a modified embodiment employing the wireless connection system, wherein components that are the same as those in FIG. 1 are represented by like numbers. The main body of the camera is provided with a wireless communication module 140 while the cradle 50*a* is provided with a wireless communication module 142 corresponding to the module 140.

In the present embodiment, the power supply of the cradle is automatically turned on when the main body of the camera is set on the cradle. Then the folder structure of the cradle is displayed on the display unit of the camera and various operations, can be executed by the input means constituted by a camera key or a pen. In this manner, it is possible to execute backup of the image data of the camera by a very simple operation, and the input/output means such as the display unit and the key switches can be dispensed with in the cradle, which can thus be produced inexpensively.

Furthermore, as the image data subjected to such backup are automatically changed to a size corresponding to the number of display pixels for transfer to the camera, so that the image display can be promptly obtained without connection to the cradle each time and without taxing the capacity of the memory medium for the taken image.

In the foregoing embodiments, the control programs are stored in the ROM 36 of the image pickup apparatus, but it is also possible to store all the control programs or a part thereof in the external memory apparatus.

Also the image reduction and the conversion of the number of gradation levels in the cradle according to the display ability of the display device of the camera, as explained in the foregoing, allows flexible adaptation to the display abilities of various image pickup apparatus, and also uses less memory, since data exceeding the display ability of the image pickup apparatus is unnecessary in case there is only required to confirm the image stored in the external memory device.

Consequently it is rendered possible to flexibly adapt to the display ability of each camera by such a modification that the camera and the cradle mutually communicate on the display ability prior to the conversion of the image data.

There may naturally be adopted a configuration enabling manual setting.

The present invention is not limited to the foregoing embodiments but is subject to various modifications within the scope and spirit of the appended claims.

What is claimed is:

1. An image pickup apparatus including an image storage medium capable of storing a plurality of captured images and image display means for displaying at least the plurality of captured images, the image pickup apparatus comprising:
   communication means capable of wire-communicating or wireless-communicating with an external storage device for backing up image information to be stored in the image storage medium;
   transfer processing means for transferring predetermined image information from the image storage medium to the external storage device via said communication means; and
   control means for receiving image information, which was transferred to the external storage device and converted therein into image information of less data amount, via said communication means and storing the received image information onto the image storage medium.

2. An image pickup apparatus according to claim 1, wherein the received image information of less data amount is image information corresponding to display ability of the image display means.

3. An image pickup apparatus according to claim 1, wherein the image display means displays an operation screen for operating an image file to be stored into the external storage device, when said communication means is in a state communicatable with the external storage device.

4. An image pickup apparatus according to claim 1, wherein said transfer processing means transmits image information which is newly photographed, to the external storage device.

5. An image pickup apparatus according to claim 1, wherein said transfer processing means includes input means for receiving a selection of image information stored on the image storage medium.

6. An image pickup apparatus according to claim 5, wherein said input means receives a touch operation of a user.

7. A control method of an image pickup apparatus including an image storage medium capable of storing a plurality of captured images and image display means for displaying at least the plurality of captured images, said control method comprising:
   wire-communicating or wireless-communicating with an external storage device for backing up image information to be stored in the image storage medium;
   transferring predetermined image information from the image storage medium to the external storage device in said communication step; and
   receiving image information, which was transferred to the external storage device and converted therein into image information of less data amount, in said communication step and storing the received image information onto the image storage medium.

8. An image pickup apparatus including an image storage medium capable of storing a plurality of captured images and an image display device that displays at least the plurality of captured images, the image pickup apparatus comprising:
   a communication unit configured to be capable of wire-communicating or wireless-communicating with an external storage device for backing up image information to be stored in the image storage medium;
   a transfer processing unit configured to transfer predetermined image information from the image storage medium to the external storage device via said communication unit; and
   a control unit configured to receive image information, which was transferred to the external storage device and converted therein into image information of less data amount, via said communication unit and storing the received image information onto the image storage medium.

9. An image pickup apparatus according to claim 8, wherein the received image information of less data amount is image information corresponding to display ability of the image display device.

10. An image pickup apparatus according to claim 8, wherein the image display device displays an operation screen for operating an image file to be stored into the external storage device, when said communication unit is in a state communicatable with the external storage device.

11. An image pickup apparatus according to claim 8, wherein the transfer processing unit transmits image information which is newly photographed, to the external storage device.

12. An image pickup apparatus according to claim 8, wherein the transfer processing unit includes an input unit configured to receive a selection of image information stored on the image storage medium.

13. An image pickup apparatus according to claim 12, wherein the input unit receives a touch operation of a user.

* * * * *